(12) United States Patent
Doulatshahi et al.

(10) Patent No.: US 8,694,196 B1
(45) Date of Patent: Apr. 8, 2014

(54) METHODS AND SYSTEMS FOR CENTRALLY MANAGED MAINTENANCE PROGRAM FOR AIRCRAFT FLEETS

(71) Applicant: The Boeing Company, Seal Beach, CA (US)

(72) Inventors: Farshad T. Doulatshahi, Mercer Island, WA (US); Blake Gibbons, University Place, WA (US); Charles K. Bautz, Jr., Seattle, WA (US); Anbessie A. Yitbarek, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/711,841

(22) Filed: Dec. 12, 2012

Related U.S. Application Data

(62) Division of application No. 11/612,749, filed on Dec. 19, 2006, now Pat. No. 8,340,854.

(51) Int. Cl.
*G01M 17/00* (2006.01)
*G06F 7/00* (2006.01)
*G06F 19/00* (2011.01)

(52) U.S. Cl.
USPC ............... 701/29.1; 701/3; 701/14; 701/29.2; 701/29.3; 701/29.4

(58) Field of Classification Search
USPC ................... 701/3, 14, 29.1, 29.2, 29.3, 29.4; 709/203
See application file for complete search history.

(56) References Cited

U.S. PATENT DOCUMENTS

| | | | | |
|---|---|---|---|---|
| 4,943,919 | A * | 7/1990 | Aslin et al. | 701/3 |
| 5,974,349 | A * | 10/1999 | Levine | 701/29.6 |
| 6,199,018 | B1 * | 3/2001 | Quist et al. | 702/34 |
| 6,772,137 | B1 * | 8/2004 | Hurwood et al. | 1/1 |
| 2002/0196794 | A1 * | 12/2002 | Bloch et al. | 370/401 |
| 2004/0111197 | A1 * | 6/2004 | Kipersztok et al. | 701/29 |
| 2005/0143956 | A1 | 6/2005 | Long et al. | |
| 2006/0097854 | A1 | 5/2006 | Basu et al. | |

FOREIGN PATENT DOCUMENTS

| | | | | |
|---|---|---|---|---|
| EP | 0810558 A2 | | 12/1997 | |
| EP | 1445721 A2 | * | 8/2004 | G06F 17/60 |

OTHER PUBLICATIONS

European Search Report for Application No. 07122939.7-1238, Mar. 11, 2008, 8 pages.

* cited by examiner

*Primary Examiner* — Khoi Tran
*Assistant Examiner* — Jorge Peche
(74) *Attorney, Agent, or Firm* — Armstrong Teasdale LLP

(57) ABSTRACT

Methods and systems for managing maintenance of a fleet of aircraft are provided. The method includes collecting data from at least one aircraft in each of the fleets related to the operation of the aircraft, determining a range of acceptable values of performance parameters associated with the collected data and based on the collected data, analyzing the collected data having values outside the range of acceptable values, and modifying at least one of a maintenance requirement and an interval between maintenance actions to facilitate reducing the number of performance parameters values that are outside the range of acceptable values during future operation of the aircraft.

20 Claims, 3 Drawing Sheets

METHODS AND SYSTEMS FOR CENTRALLY MANAGED MAINTENANCE PROGRAM FOR AIRCRAFT FLEETS

CROSS-REFERENCE TO RELATED APPLICATIONS

This application is a divisional application of U.S. patent application Ser. No. 11/612,749, filed Dec. 19, 2006, entitled "METHODS AND SYSTEMS FOR CENTRALLY MANAGED MAINTENANCE PROGRAM FOR AIRCRAFT FLEETS", the disclosure of which is hereby incorporated herein by reference in its entirety.

BACKGROUND OF THE INVENTION

This invention relates generally to maintenance of commercial fleet vehicles, especially aircraft and more particularly, to methods and systems for a centrally managed maintenance program.

At least some known airlines prepare customized scheduled maintenance programs for individual regulatory approval based on the manufacturer's standard instructions. However, because the airlines lack fleet-wide information, the airlines' maintenance programs can be conservative, inefficient, and costly. The approval process for implementing new or modified procedures is a duplicated process—taking place at every airline through the assigned regulatory authority.

Currently, maintenance programs are enhanced at two levels: Firstly, with the manufacturer, program enhancement proposals are reviewed during periodic industry steering committee (ISC) meetings. This activity is supported by data from participating operators. The data primarily represents scheduled maintenance findings. In-service events are largely missing from this process. The optimization process is very conservative and applies to all operators with minimum feedback on program effect on the operation. Secondly, airlines also enhance maintenance programs within their own operations. The process involves analysis of maintenance data pertaining to their own operation and at times with consultation and information exchange with the manufacturer. The information exchange is mainly limited to component data and does not reflect all aspects of fleet performance.

Maintenance program enhancement relies on performance data from airplane operation and maintenance activities. Many monitoring and performance management tools can contribute to making this process more efficient. However the basic processes used by airlines to customize and manage maintenance data have not taken advantage of these tools and have seen little change over the last two decades.

BRIEF DESCRIPTION OF THE INVENTION

In one embodiment, a method of managing maintenance of a fleet of aircraft by a business entity for a plurality of customers includes collecting data from at least one aircraft in each of the fleets related to the operation of the aircraft, determining a range of acceptable values of performance parameters associated with the collected data and based on the collected data, analyzing the collected data having values outside the range of acceptable values, and modifying at least one of a maintenance requirement and an interval between maintenance actions to facilitate reducing the number of performance parameters values that are outside the range of acceptable values during future operation of the aircraft.

In another embodiment, a system for centralized maintenance management of a fleet of aircraft by a business entity for a plurality of customers includes a data acquisition subsystem configured to collect operational performance data and maintenance data from at least one aircraft in the fleet, a monitoring subsystem configured to receive the collected operational performance data and maintenance data and to determine a range of acceptable values of performance parameters associated with the collected data and based on the collected data. The system also includes an analyzer subsystem configured to receive the determined ranges and the collected data, the analyzer further configured to determine which of the collected data include values outside the determined ranges and determine at least one of aircraft systems, maintenance tasks, and environmental factors that influence the values of the collected data and a maintenance task database including information relating to maintenance tasks performed on aircraft in the fleet and intervals of performance of the maintenance tasks wherein at least one of a maintenance requirement and an interval between maintenance actions is modified to facilitate reducing the number of performance parameters values that are outside the range of acceptable values during future operation of the aircraft.

In yet another embodiment, a method of managing maintenance of fleet vehicles for multiple customers includes collecting performance data and maintenance information related to the operation of the vehicles, storing the performance data and maintenance information in a database, accessing the performance data and maintenance information at a central operations center, determining acceptable ranges of values of the performance data and maintenance information and acceptable trends of the performance data and maintenance information using the stored performance data and maintenance information, analyzing the stored data for values and trends that exceed the determined acceptable ranges of values and acceptable trends of the performance data and maintenance information, and modifying an interval between maintenance actions to facilitate reducing the number of performance data and maintenance information that are outside the range of acceptable values during future operation of the aircraft.

DETAILED DESCRIPTION OF THE INVENTION

Figure 1:
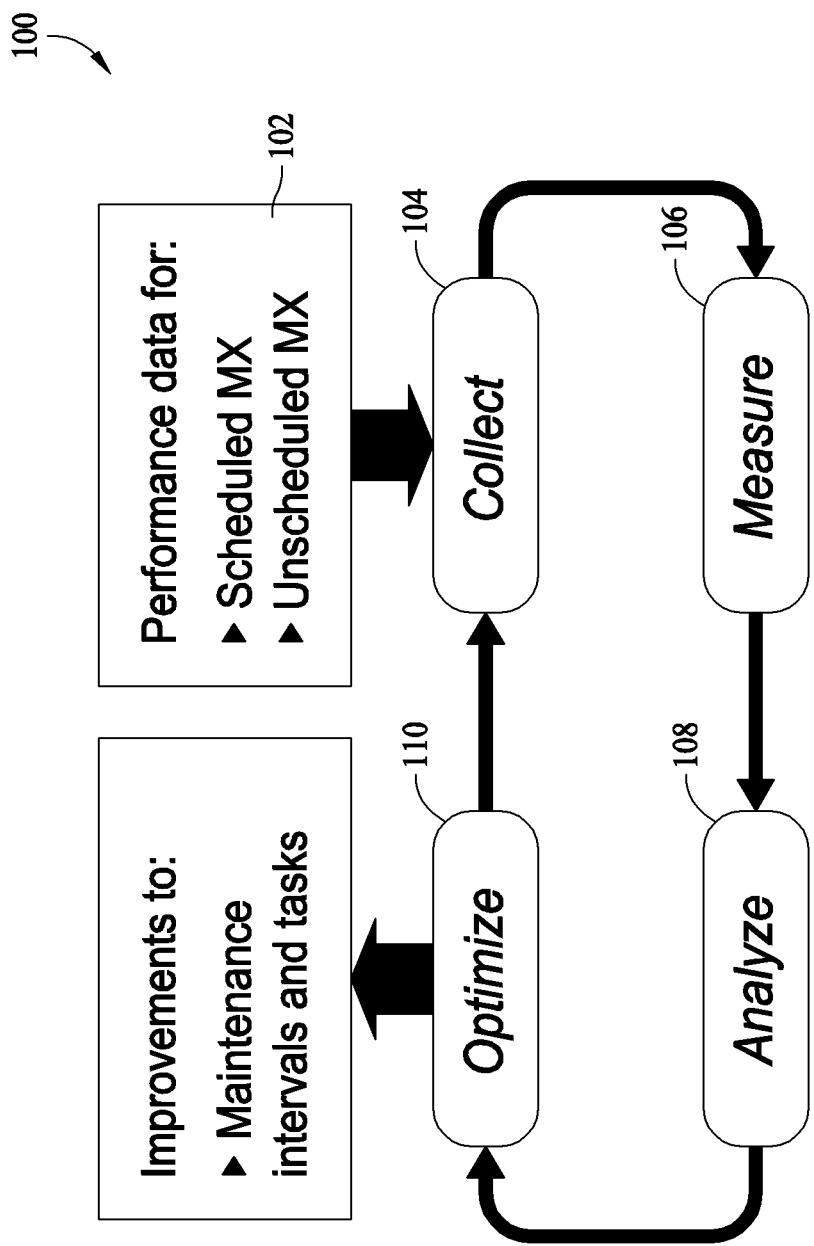
FIG. 1 is a data flow diagram of a centralized maintenance management program (CMMP) in accordance with an exemplary embodiment of the present invention.

FIG. 1 is a data flow diagram of a centralized maintenance management program (CMMP) 100 in accordance with an exemplary embodiment of the present invention. Performance data is routinely generated 102 during the life cycle of airplanes. Data provides a qualitative and quantitative framework measuring the reliability of aircraft structures, systems, components, and power plants. Centrally Managed Maintenance Program uses an automated statistical analysis system to monitor 104 the scheduled maintenance performance of airplane systems and structures. The maintenance and performance data is measured 106 against predetermined parameters to establish trends and derived data that are used for further analysis 108 and identify trends that fall outside normal parameters. Maintenance intervals and tasks are then optimized 110 using automated and manual analysis techniques. The analysis establishes a relationship between scheduled maintenance task events and maintenance events (task findings and in-service failures). The program also centralizes a regulatory approval process. The automated statistical analysis system of CMMP 100 may include portions of a maintenance interval determination and optimization tool (MIDOT) and may be used with MIDOT as is disclosed in co-pending U.S. patent application Ser. No. 11/489,864 filed Jul. 20, 2006 entitled "Maintenance Interval Determination and Optimization Tool and Method", the entire contents of which are herein incorporated by reference including associated information disclosure statements.

Performance data is collected using on board data acquisition systems. The data is transmitted to a centralized maintenance database where data from other aircraft in the fleet will also be transmitted. Additionally, maintained records for each aircraft are entered into an electronic form if not already in an electronic form and also transmitted to the centralized maintenance database. Engineers having access to the centralized maintenance database monitor the incoming data collected and the data is also monitored automatically. The incoming data is measured against fleet data to establish trends. The data is grouped by any of several different parameters for analysis against common operational and environmental histories. Known influencers for each component and system are also analyzed to facilitate root cause analysis of data that are outside acceptable ranges or are trending to be outside acceptable ranges in a predetermined amount of time.

System reliability may not only be determined by the material of construction and the quality of the fabrication but, also may be influenced by other systems that may have a shortened life for a variety of reasons. One system, for example, may experience a shortened life due to operation over a marine environment. The reduced capacity of that system may adversely affect the life of a second system. Simply repairing the second system may not discover the true nature of the failure. However, using the CMMP, the analysis of the second system when triggered will determine that the second system fails early not because it is affected by the marine environment but, because the first system that influences the second system is affected by the marine environment. A far-reaching collection of performance and maintenance data permits the analysis to determine influencers of a system operation such that the root cause of the failure can be corrected. The analysis is overseen by an engineer that is capable of receiving the results of automatic analysis and determining the accuracy of the automatic analysis and modifying the logic and/or the rule-based automatic analysis software to optimize the automatic data analysis software. The engineer is also capable of initiating changes to maintenance intervals and to maintenance procedures based on both the automatic analysis and the manual analysis. Regulatory approval of maintenance interval and maintenance procedure changes is facilitated in that regulatory approval can be initiated by the aircraft manufacturer as a service for a group of airplanes, or the whole fleet. So long as the airplane complies with the approved changes, further approval by the individual airline may not be required.

Figure 2:
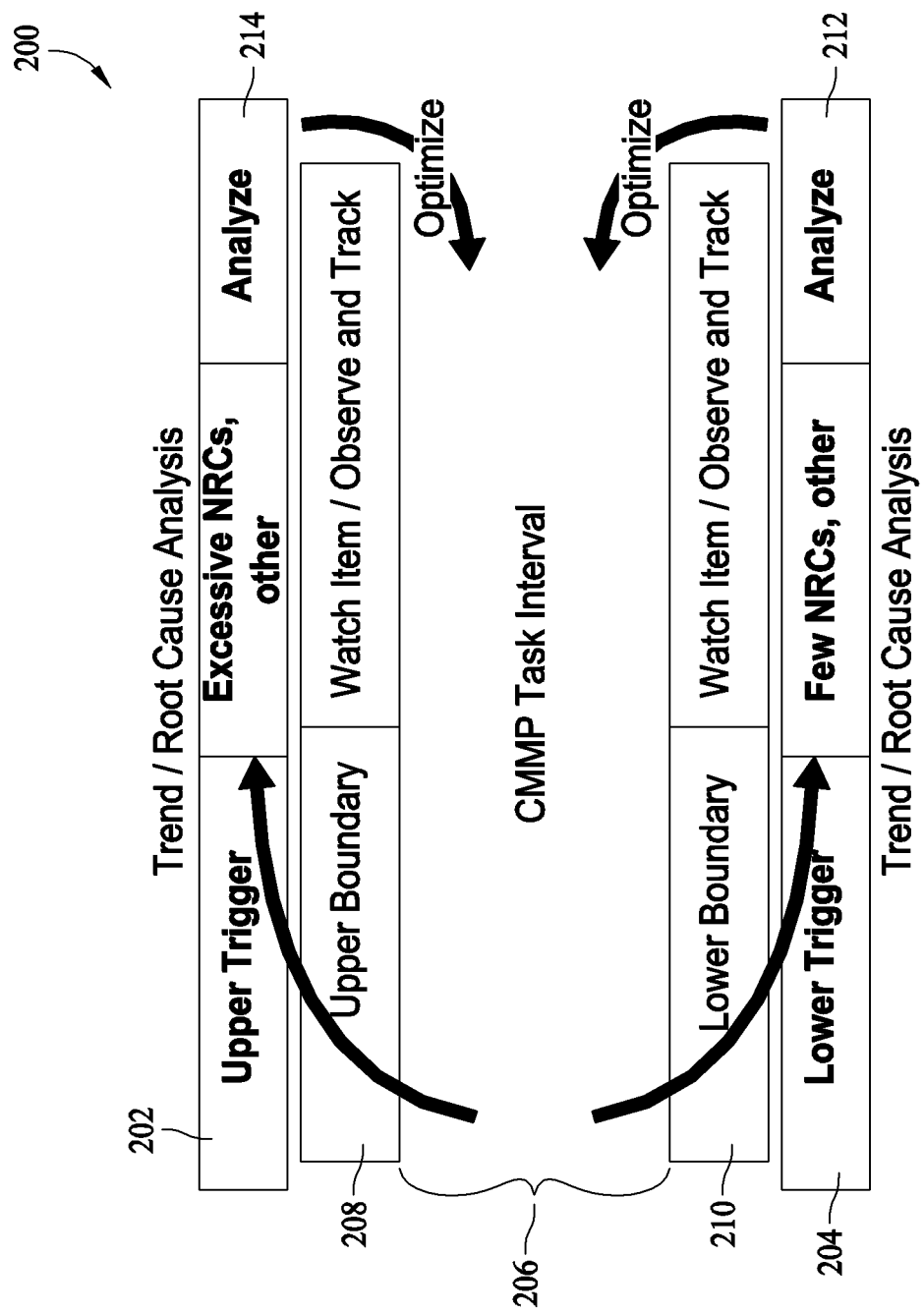
FIG. 2 is a data flow diagram of an exemplary method of determining optimum maintenance performance intervals using CMMP.

FIG. 2 is a data flow diagram of an exemplary method 200 of determining optimum maintenance performance intervals using CMMP. CMMP utilizes an upper optimization trigger 202 and a lower optimization trigger 204 in conjunction with a fleet baseline range 206 to assess aircraft operation and maintenance performance and trends. Fleet baseline range 206 represents established performance parameters for scheduled maintenance tasks.

Optimization triggers 202 and 204 indicate task findings and in-service findings that exceed fleet baseline boundaries. Lower trigger 204 are activated by an excessive number of no findings or component life spans that exceed normal limits, indicating a scheduled task interval can be increased. Upper triggers are activated by an excessive number of findings or premature component replacements, indicating a task interval should be decreased.

The CMMP program continuously identifies optimization opportunities through an automated process. Task findings and in-service failures falling outside the task interval range are first placed on an upper boundary watch list 208 or a lower boundary watch list 210, respectively. When watch list 208 or 210 includes a statistically significant number of findings related to the same task or component, an upper optimization trigger 202 or lower optimization trigger 204 is activated. An appropriate statistical model such as a Weibull distribution is derived from the data to determine the optimal task inspection interval. The automated statistical analysis is then evaluated by an engineer, who substantiates the recommended adjustment using root cause analysis and other engineering models.

Analysis 212 of lower optimization triggers 204 includes trend analysis, root cause analysis, and engineering analysis. Analysis using trend analysis identifies routine tasks that show no or few in-service write-ups or task findings. Analysis using root cause analysis includes an assessment of lessons learned to determine whether there are opportunities to duplicate the trend, and analysis using engineering analysis assesses and analyzes applicable quantitative and qualitative data.

Analysis 214 of upper optimization triggers 202 also includes trend analysis, root cause analysis, and engineering analysis. Analysis using trend analysis identifies routine tasks that generate excessive non-routine write-ups or task findings. Trend analysis also identifies common trends among the airlines that participate to supply performance and maintenance data. Root cause analysis is used to pinpoint failure elements and an assessment of failure causes is used to improve the maintenance requirements or product development. Engineering analysis of upper optimization triggers 202 is used to assess and analyze applicable quantitative and qualitative data.

Reporting of analysis that is automatically generated during the process permits an engineer to monitor and evaluate the process and verify recommendations made by the process for further analysis. Such reports include the number of tasks within acceptable parameters, the number of watch list tasks above existing parameters, the number of watch list tasks below existing parameters, a percentage of each group of items, and a relationship between system, structural element, or component failures and scheduled task.

Figure 3:
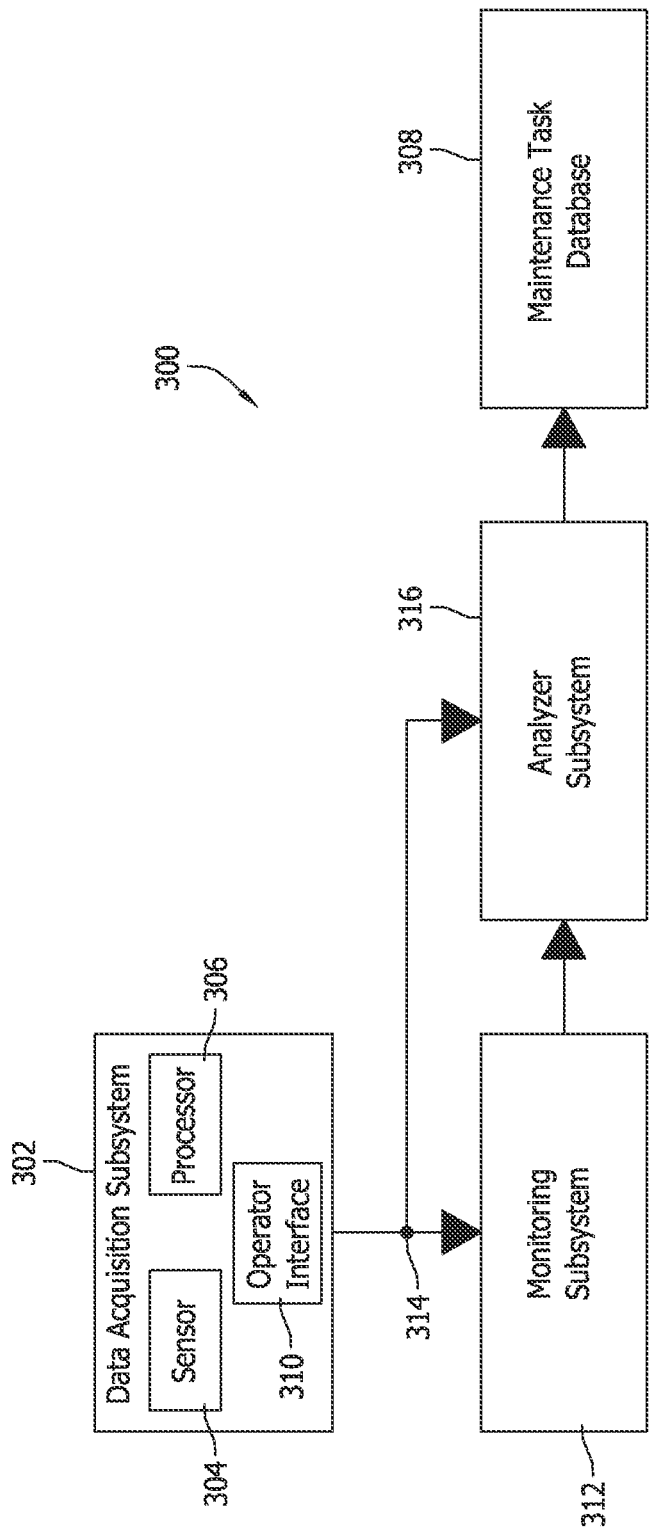
FIG. 3 is a schematic block diagram of CMMP in accordance with an exemplary embodiment of the present invention.

FIG. 3 is a schematic block diagram of CMMP 300 in accordance with an exemplary embodiment of the present invention. In the exemplary embodiment, CMMP 300 comprises a system for centralized maintenance management of a fleet of aircraft by a business entity for a plurality of customers. In an alternative embodiment, CMMP 300 is used by a fleet vehicle operator to manage maintenance for a fleet of vehicles. CMMP 300 includes a data acquisition subsystem 302 configured to collect operational performance data and maintenance data from at least one aircraft or other vehicle in the fleet. The collected data typically includes scheduled maintenance data and/or unscheduled maintenance data and may be into CMMP 300 by at least one of the customer and a maintenance, repair and overhaul operator (MRO) separate from the customer. The collected data also may include onboard aircraft faults, service interruption data, a number of aircraft flight hours, and a number of aircraft flight cycles, and the current configuration of the aircraft.

Each vehicle may include a plurality of sensors 304 that transmit respective operational data to an onboard processor 306. Processor 306 may preprocess the data before transmitting the data to a centralized database 308 for storage and further processing. Moreover, data acquisition subsystem 302 includes an operator interface 310 to permit manual entry of operational and maintenance data relating to the operation and scheduled and unscheduled maintenance of the vehicle. Operator interface 310 may be an integral part of data acquisition subsystem 302 or may be a stand-alone device capable of communicating with data acquisition subsystem 302 through a wired or wireless communications link.

CMMP 300 includes a monitoring subsystem 312 configured to receive the collected operational performance data and maintenance data 314 and to determine a range of acceptable values of performance parameters associated with the collected data and based on the collected data. The determined range of acceptable values of the performance parameters is based on the collected data from those aircraft having similar operating histories. The operating histories may also be based on a time interval, an operational hours interval, operational conditions, environmental conditions, load, stress, and/or cycle conditions. Monitoring subsystem is further configured to determine a trend of the values of the performance parameters associated with the data and determine a range of acceptable values of performance parameters associated with the collected data and based on the determined trend of the collected data.

CMMP 300 includes an analyzer subsystem 316 configured to receive the determined ranges and the collected data. The analyzer subsystem 316 is further configured to determine which of the collected data include values outside the determined ranges and determine which, if any of the aircraft systems, maintenance tasks, and/or environmental factors affecting the aircraft that influences the values of the collected data. Such influencers may contribute directly or indirectly to failures or reduced performance of other systems such that continued maintenance on the failed systems does not correct the root problem causing the continued failures. Analyzer subsystem 316 is further configured to analyze the collected data having values that are trending to be outside the range of acceptable values. Analyzer subsystem 316 is further configured to determine a contributory performance parameter for each of the data having values outside the range of acceptable values. At predetermined stages of automatic anaylisis by analyzer subsystem 316, an alert may be generated to indicate a recommendation for further engineering analysis by a user, typically an engineer monitoring CMMP 300. Such a further analysis recommendation is based on predetermined logic rules. The engineer is then able to review the automatic analysis to determine a further analysis course and/or a modification to analyzer subsystem 316 that will permit analyzer subsystem 316 to continue analysis automatically.

CMMP 300 also includes maintenance task database 308 that includes information relating to maintenance tasks performed on aircraft in the fleet and intervals of performance of the maintenance tasks. The maintenance tasks and/or maintenance intervals stored in database 308 are changed when further analysis of the data as described above indicates a maintenance task procedure or interval may be optimized to facilitate reducing the number of performance parameters values that are outside the range of acceptable values during future operation of the aircraft.

Data in CMMP 300 is transmitted using a data network configured to transmit the collected data between at least one of the customer, a maintenance, repair and overhaul operator (MRO), and the business entity. In the exemplary embodiment, the network includes at least one wireless communications link.

Although embodiments of this invention has been described with respect to certain exemplary embodiments, it is to be understood that the specific embodiments are for purposes of illustration and not limitation, as other variations will occur to those of skill in the art. For example, while the preferred embodiment has been described in connection with its application to aircraft fleets, the invention can also be used with and successfully applied to other types of vehicles and vessels.

The above-described methods and systems for achieving a higher level of optimization of maintenance intervals and procedures are cost-effective and highly reliable. The methods permit a service provider to optimize maintenance programs through performance monitoring tools and processes. The performance monitoring process entails collection of data related to all maintenance activities during airplane in-service and out of service life cycle. The analysis entails of an automated tool that identifies opportunities through a trigger point process and directs engineers to the elements that influence and contribute to degradation of airplane systems, components and structural elements. Analysis also points to the effectiveness of the maintenance requirements. Engineering analysis validates the data trigger points and facilitates identifying "best practices." Accordingly, the methods and systems facilitate operation and maintenance of aircraft fleets in a cost-effective and reliable manner.

While the invention has been described in terms of various specific embodiments, those skilled in the art will recognize that the invention can be practiced with modification within the spirit and scope of the claims.

What is claimed is:

1. A system for centralized maintenance management of a fleet of aircraft by a business entity for a plurality of customers operating the fleet of aircraft, said system comprising:
   a data acquisition subsystem configured to collect operational performance data and maintenance data from at least one aircraft in the fleet;
   a monitoring subsystem configured to receive the collected operational performance data and maintenance data for a plurality of aircraft in the fleet and to determine a range of acceptable values of performance parameters associated with the collected data and based on the collected data from those aircraft having similar operating histories;
   an analyzer subsystem configured to receive the determined ranges and the collected data, said analyzer further configured to determine which of the collected data include values outside the determined ranges and determine at least one of aircraft systems, maintenance tasks, and environmental factors that influence the values of the collected data; and
   a maintenance task database including information relating to maintenance tasks performed on aircraft in the fleet and intervals of performance of the maintenance tasks wherein at least one of a maintenance requirement and an interval between maintenance actions is modified to facilitate reducing the number of performance parameters values that are outside the range of acceptable values during future operation of the aircraft.

2. A system in accordance with claim 1 further comprising a data network configured to transmit the collected data between at least one of the customer, a maintenance, repair and overhaul operator (MRO), and the business entity.

3. A system in accordance with claim 2 wherein said network includes at least one wireless communications link.

4. A system in accordance with claim 1 wherein the collected data comprises at least one of scheduled maintenance data and unscheduled maintenance data.

5. A system in accordance with claim 1 wherein the collected data comprises at least one of scheduled maintenance data and unscheduled maintenance data entered into the system by at least one of the customer and a maintenance, repair and overhaul operator (MRO) separate from the customer.

6. A system in accordance with claim 1 wherein the operating histories are based on at least one of time interval, operational hours interval, operational conditions, environmental conditions, load, stress, and cycle conditions.

7. A system in accordance with claim 1 wherein said monitoring subsystem is further configured to determine a trend of the values of the performance parameters associated with the data and determine a range of acceptable values of performance parameters associated with the collected data, and based on the determined trend of the collected data, and said analyzer subsystem is further configured to analyze the collected data having values that are trending to be outside the range of acceptable values.

8. A system in accordance with claim 1 wherein said analyzer subsystem is further configured to determine a contributory performance parameter for each of the data having values outside the range of acceptable values.

9. A system in accordance with claim 1 wherein the collected data includes at least one of on-board aircraft faults, scheduled and unscheduled maintenance data, service interruption data, a number of aircraft flight hours, and a number of aircraft flight cycles.

10. A system in accordance with claim 1 wherein the data includes the current configuration of the aircraft.

11. A method of managing maintenance of fleet vehicles for multiple customers using a system including a processor, said method comprising:
collecting performance data and maintenance information related to the operation of the vehicles;
storing the performance data and maintenance information in a database;
accessing the performance data and maintenance information at an engineering facility;
determining acceptable ranges of values of the performance data and maintenance information and acceptable trends of the performance data and maintenance information using the stored performance data and maintenance information;
analyzing, by the processor, the stored data for values and trends that exceed the determined acceptable ranges of values and acceptable trends of the performance data and maintenance information; and
modifying an interval between maintenance actions to facilitate reducing the number of performance data and maintenance information that are outside the range of acceptable values during future operation of the vehicles.

12. A method in accordance with claim 11 further comprising:
wirelessly transmitting the collected data from at least one of the multiple customers and a maintenance, repair and overhaul operator (MRO) separate from the multiple customers to the engineering facility, and
storing the data at the engineering facility.

13. A method in accordance with claim 12 further comprising:
storing the collected data in a computer based server;
coupling at least one maintenance, repair and overhaul operator (MRO) in a data communications network with the engineering facility and the computer-based sever; and
transmitting maintenance planning and scheduling instructions to the at least one maintenance, repair and overhaul operator (MRO) through the data communications network.

14. A method in accordance with claim 11, wherein collecting performance data and maintenance information comprises collecting performance data and maintenance information that includes at least one of on-board aircraft faults, scheduled and unscheduled maintenance data, service interruption data, a number of aircraft flight hours, and a number of aircraft flight cycles.

15. A method in accordance with claim 11 wherein storing the performance data and maintenance information comprises storing at least one of scheduled maintenance data and unscheduled maintenance data.

16. A method in accordance with claim 15 wherein storing at least one of scheduled maintenance data and unscheduled maintenance data comprises entering the at least one of scheduled maintenance data and unscheduled maintenance data by at least one of the customer and a maintenance, repair and overhaul operator (MRO) separate from the customer.

17. A method in accordance with claim 11 further comprising determining a range of acceptable values of the performance data and maintenance information for aircraft with similar operating histories based on the data collected from those aircraft having similar operating histories.

18. A method in accordance with claim 17 wherein the operating histories are based on at least one of time interval, operational hours interval, operational conditions, environmental conditions, load, stress, and cycle conditions.

19. A system for centralized maintenance management of a fleet of aircraft by a business entity for a plurality of customers operating the fleet of aircraft, said system comprising:
a monitoring subsystem configured to receive operational performance data and maintenance data collected for a plurality of aircraft in the fleet;
an analyzer subsystem configured to receive the collected data, determine which of the collected data include values outside of one or more predetermined ranges of acceptable values of performance parameters associated with the collected data, and analyze at least a portion of the collected data using at least one of trend analysis, root cause analysis, and engineering analysis; and
a maintenance task database including information relating to maintenance tasks performed on aircraft in the fleet and intervals of performance of the maintenance tasks wherein at least one of a maintenance requirement and an interval between maintenance actions is modified to facilitate reducing the number of performance parameters values that are outside the predetermined ranges of acceptable values during future operation of the aircraft.

20. A system in accordance with claim 19 wherein said monitoring subsystem is further configured to determine a trend of the values of performance parameters associated with the collected data, analyze the collected data having values that are trending to be outside the range of acceptable values, and determine, based on the determined trend of the collected data, a new range of acceptable values of performance parameters associated with the collected data.

* * * * *